United States Patent
Probyn (10) Patent No.: US 10,180,847 B2
(45) Date of Patent: Jan. 15, 2019

(54) CIRCUITRY FOR CONFIGURING ENTITIES

(71) Applicant: STMicroelectronics (Research & Development) Limited, Marlow, Buckinghamshire (GB)

(72) Inventor: Gavin Probyn, Swindon (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 0 days.

(21) Appl. No.: 15/478,944

(22) Filed: Apr. 4, 2017

(65) Prior Publication Data
US 2017/0206099 A1 Jul. 20, 2017

Related U.S. Application Data

(62) Division of application No. 14/552,532, filed on Nov. 25, 2014, now Pat. No. 9,645,830.

(30) Foreign Application Priority Data

Nov. 29, 2013 (GB) .................................. 1321057.0

(51) Int. Cl.
| | |
|---|---|
| *G06F 12/00* | (2006.01) |
| *G06F 9/00* | (2006.01) |
| *G06F 9/445* | (2018.01) |
| *G06F 9/4401* | (2018.01) |

(Continued)

(52) U.S. Cl.
CPC ........ *G06F 9/44505* (2013.01); *G06F 9/4403* (2013.01); *G06F 9/4411* (2013.01); *G06F 9/4881* (2013.01); *G06F 13/102* (2013.01)

(58) Field of Classification Search
CPC .................................. G06F 12/00; G06F 9/00
See application file for complete search history.

(56) References Cited

U.S. PATENT DOCUMENTS

| | | | |
|---|---|---|---|
| 5,548,782 A | 8/1996 | Michael et al. | |
| 6,640,262 B1 | 10/2003 | Uppunda et al. | |
| 7,266,680 B1 | 9/2007 | Reinbold | |

(Continued)

FOREIGN PATENT DOCUMENTS

| | | |
|---|---|---|
| EP | 0273136 A2 | 7/1988 |
| GB | 2433333 A | 6/2007 |
| WO | WO-9427224 A1 | 11/1994 |

OTHER PUBLICATIONS

UK-IPO Search Report for GB 1321057.0 dated Mar. 26, 2014 (4 pages).

*Primary Examiner* — David E Martinez
(74) *Attorney, Agent, or Firm* — Crowe & Dunlevy (57) ABSTRACT

A method disclosed herein includes operating a processor of a system on a chip in a configuration mode until completion of a set of tasks, and operating the processor in a normal operation mode after completion of the set of tasks. During the configuration mode, the method includes performing steps of sending by the processor of configuration information to a configuration programming block, sending by the configuration programming block of the configuration information to one or more electronic components to thereby complete a first subset of the set of tasks, while permitting the processor to complete a second subset of the set of tasks, and sending by the configuration programming block of a notification to the processor after completing the first subset of the set of tasks.

18 Claims, 3 Drawing Sheets

(51) Int. Cl.
  *G06F 9/48* (2006.01)
  *G06F 13/10* (2006.01)

(56) References Cited

U.S. PATENT DOCUMENTS

| | | | |
|---|---|---|---|
| 8,489,837 B1* | 7/2013 | Lee | G06F 3/0619 |
| | | | 711/166 |
| 2002/0091920 A1 | 7/2002 | Sasaki et al. | |
| 2002/0188701 A1 | 12/2002 | Brown et al. | |
| 2003/0177344 A1 | 9/2003 | Harvey | |
| 2006/0129777 A1* | 6/2006 | Hobson | G06F 9/445 |
| | | | 711/168 |
| 2007/0162650 A1 | 7/2007 | Bruce | |
| 2013/0067133 A1* | 3/2013 | Mansell | G06F 11/3636 |
| | | | 710/267 |
| 2014/0223158 A1* | 8/2014 | Zhou | G06F 9/4405 |
| | | | 713/2 |

* cited by examiner

CIRCUITRY FOR CONFIGURING ENTITIES

RELATED APPLICATION

This application is a divisional of U.S. application Ser. No. 14/552,532 filed Nov. 25, 2014, which itself claims priority from Great Britain Application for Patent No. 1321057.0 filed Nov. 29, 2013, the disclosures of both of which are incorporated herein by reference.

TECHNICAL FIELD

Some embodiments may relate to circuitry for configuring one or more entities, for example peripheral devices.

BACKGROUND

System on chip devices (SOCs) may have various circuitry blocks, bus interfaces, memory devices and one or more system buses for communicating information. In many system on chip devices, one of the first activities performed by the host CPU (computer processing unit) is to configure or boot system peripherals. In some scenarios, this may be a significant proportion of the overall system start up time.

SUMMARY

According to an aspect, there is provided a configuration arrangement comprising: a first interface configured to receive configuration information from a master configuration function; a second interface configured to provide at least one output to one or more entities to be configured: and configuration circuitry, responsive to said configuration information to provide said at least one output, said at least one output for controlling the configuration of said one or more entities.

The configuration circuitry may be configured to set at least one bit in at least one of said one or more entities.

The configuration circuitry may be configured to write data to an address of at least one entity a plurality of times.

The configuration circuitry may be configured to read one or more bits from at least one entity, change a value of one or more of said bits and write said changed bits back into said at least one entity.

The configuration circuitry may be configured to write common data to one or more of said entities The configuration circuitry may be configured to write said common data to a plurality of different addresses in an address range of at least one entity.

The configuration circuitry may be configured to poll at least one of said entities for status information.

The configuration circuitry may comprise at least one memory configured to store configuration information for controlling said configuration arrangement.

The at least one memory may comprise at least one register.

The configuration circuitry may comprise at least one finite state machine configured to run instructions stored in said at least one memory.

The configuration circuitry may be configured to block direct traffic for said at least one entity when said configuration circuitry is controlling the configuration of said one or more entities.

When one of more of said one or more entities has been configured, said configuration circuitry may be configured to provide a notification to the master configuration function.

The notification may comprise at least one status bit or an interrupt.

The configuration circuitry may comprise an address decoder for determining if a received transaction is for said configuration arrangement.

The circuitry may comprise a mode in which data is passed without modification through said configuration arrangement.

When in said second mode, said data may be passed transparently through said configuration arrangement.

The master configuration function may comprise a computer processing unit.

One or more of said one or more entities may comprise a peripheral device.

The configuration of said one or more entities may comprise a booting of said one or more entities.

The configuration of said one or more entities may comprise re-configuration of one or more of said entities.

The configuration of said one or more entities may comprise configuring one or more peripheral entities which are brought into use during an operation of a system.

According to another aspect, there is provided a system comprising a configuration arrangement as discussed above, said master configuration function and said one or more entities.

The system may comprise a memory, and said master configuration function may be configured to transfer data with said memory while said configuration arrangement is configuring at least one entity.

The system may comprises an entity configuration network providing a communication path between said configuration arrangement and said at least one entity, said configuration arrangement being provided at a root of said entity configuration network.

The system may comprise a relatively fast bus branch between said master configuration function and a bus system and a relatively slow bus branch between said bus system and said at least one entity.

The configuration arrangement may be provided in said relatively slow bus branch.

According to another aspect, there is provided a device comprising a system as discussed previously.

According to another aspect, there is provided an integrated circuit or die comprising a configuration arrangement as discussed previously or a system as discussed previously.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Some embodiments will now be described, by way of example only, to the accompanying drawings in which.

DETAILED DESCRIPTION OF THE DRAWINGS

A system on chip device may need to be booted. One of the activities performed by the host CPU is to configure system peripherals. In some embodiments, this may be one of the first activities.

It should be appreciated that embodiments may be used at boot time for configuring a peripheral device and/or may be used for re-configuration of a peripheral device in use and/or configuration of one or more peripheral devices and/or the configuration of one or more peripheral devices which are brought into use during the operation of the system on chip. One or more of the peripheral devices requiring configuration may involve serial activities with relatively slow responding entities. The following embodiments refer to the configuration or boot up of peripheral devices. This is by way of example only and any other suitable entities may instead or additionally be configured.

Often, one or more of the peripheral devices may use relatively low performance system clocks, i.e. relatively slow clocks and/or have a relatively high latency path to that device from for example a CPU. If the CPU is responsible for the configuration of one or more peripherals, this may result in idle CPU cycles where the CPU waits for the one or more peripherals to respond.

In some embodiments, a configuration programming block is provided which controls the configuration of one or more peripherals. The configuration of the one or more peripherals is thus delegated to the configuration programming block from the CPU. Thus the CPU may perform other operations while the configuration of the one or more peripheral device occurs. For example, the CPU may be used to configure other parts of the system. This may improve efficiency and/or may reduce overall system setup or boot time/or reconfiguration Reference is made to FIG. 1 which schematically shows a device 7 having a system 1. The system 1 comprises a CPU 2 which is programmed to control the configuration of a system on chip. This may be a master configuration function. It should be appreciated that one or more of the entities of the system which are configured by a CPU may be provided on the same die or integrated circuit as the CPU, and/or on one or more different dies or integrated circuits to the CPU. In some embodiments, one or more entities which are to be configured may be provided off chip or off die.

Figure 1:
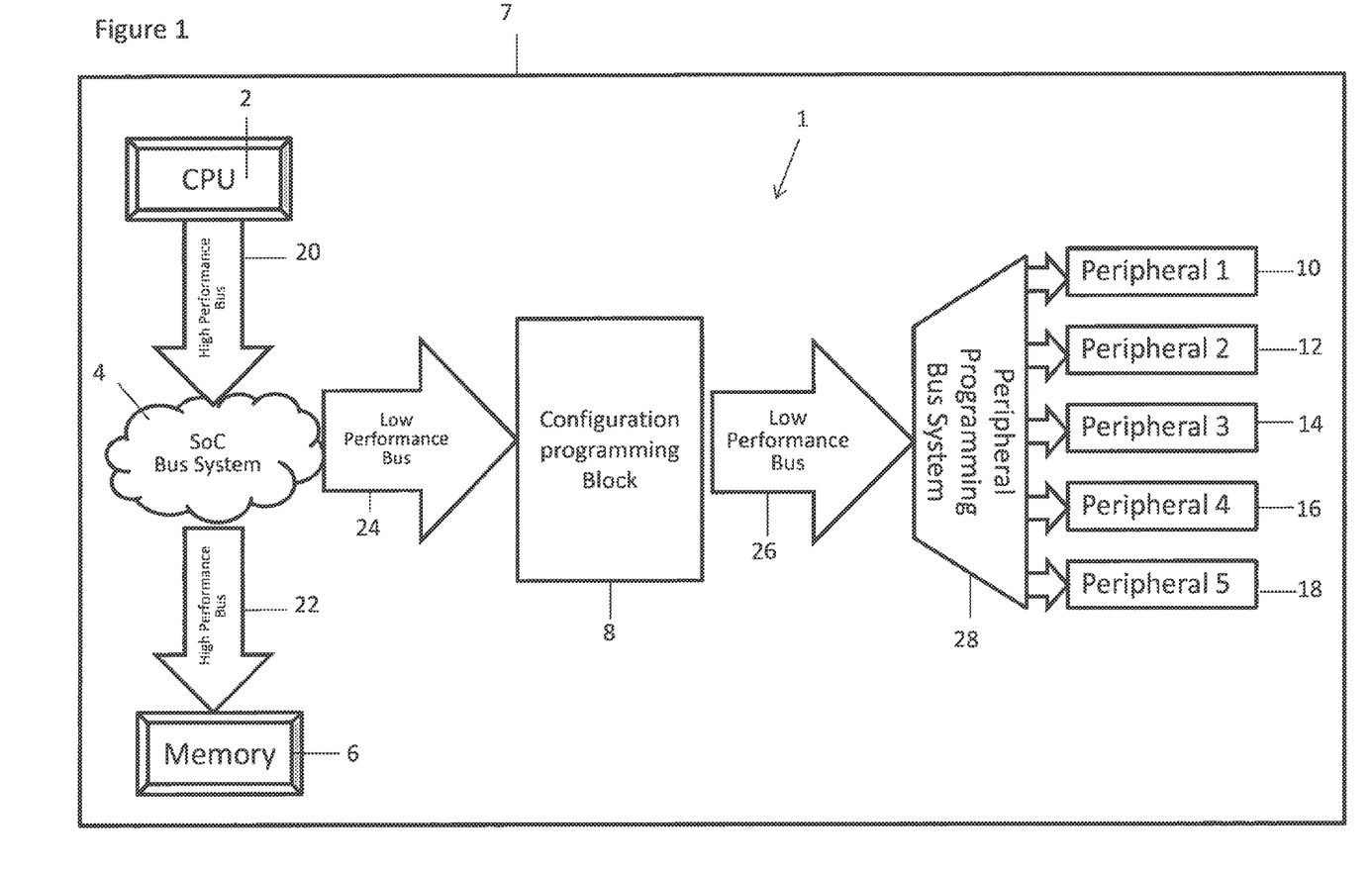
FIG. 1 shows a system in which some embodiments may be provided.

The CPU 2 is provided with a relatively high-performance bus branch 20 which allows the CPU to have access to the system on chip bus system. A relatively high performance bus may be one or more of relatively fast and relatively large (that is having a relatively large bandwidth). The latency may be relatively low with the relatively high performance. Another relatively high-performance bus branch 22 is provided between the system on chip bus system 4 and a memory 6. The CPU may have a relatively low latency and/or relatively high bandwidth path to the memory 6. In some embodiments, the CPU may prioritize the data transfer with the memory 6 as part of a boot operation, for example.

The memory 6 can be any suitable memory, such as a DDR memory or the like. The memory may be on the same die or integrated circuit as the CPU and/or on a different die or integrated circuit to the CPU. The memory can be provided on one or more dies or integrated circuits. In some embodiments, a memory controller is provided which itself alternatively or additionally requires configuration. The memory controller may be provided on the same die or integrated circuit as the CPU 2 or a different die or integrated circuit to the CPU 2.

A configuration programming block 8 is provided. That configuration programming block 8 is coupled to the system on chip bus system 4 by a relatively low performance bus branch, as compared for example to bus branch 20 or 22. A relatively low performance bus may have one or more of relatively slow and relatively narrow bus connections (that is having a relatively small bandwidth).

The configuration programming block 8 will be described in more detail later. The configuration programming block 8 is coupled to a peripheral programming bus system 28 by another relatively low performance bus branch 26.

The peripheral programming bus system 28 is coupled to one or more peripheral devices. In this example, five peripheral devices are shown and respectively referenced 10, 12, 14, 16 and 18. It should be appreciated that five peripheral devices are shown by way of example only. In some embodiments, more or less than five peripheral devices may be provided.

In some embodiments, more than one peripheral bus system may be provided. For example in some embodiments, each peripheral bus system may be associated with one or more peripheral devices. One or more peripheral bus systems may be coupled to the output of a higher level peripheral bus system.

There may be a relatively high latency, low bandwidth configuration data path between the system on chip bus system 4 and the peripheral programming bus system 28.

In some embodiments, the configuration programming block 8 is configured to reduce some of the repetitive configuration operations performed by the CPU during system boot, a relatively high activity peripheral configuration phases or any other configuration which is required.

By way of example only, one example of configuration which will be controlled by the configuration programming block 8 is where a common bit needs to be set in a number of registers to activate a feature, and/or multiple writes of the same data to a certain address to flush an output buffer. These operations are by way of example only and the configuration programming block 8 may take any other suitable action in relation to one or more peripherals in order to configure those peripherals.

Figure 2:
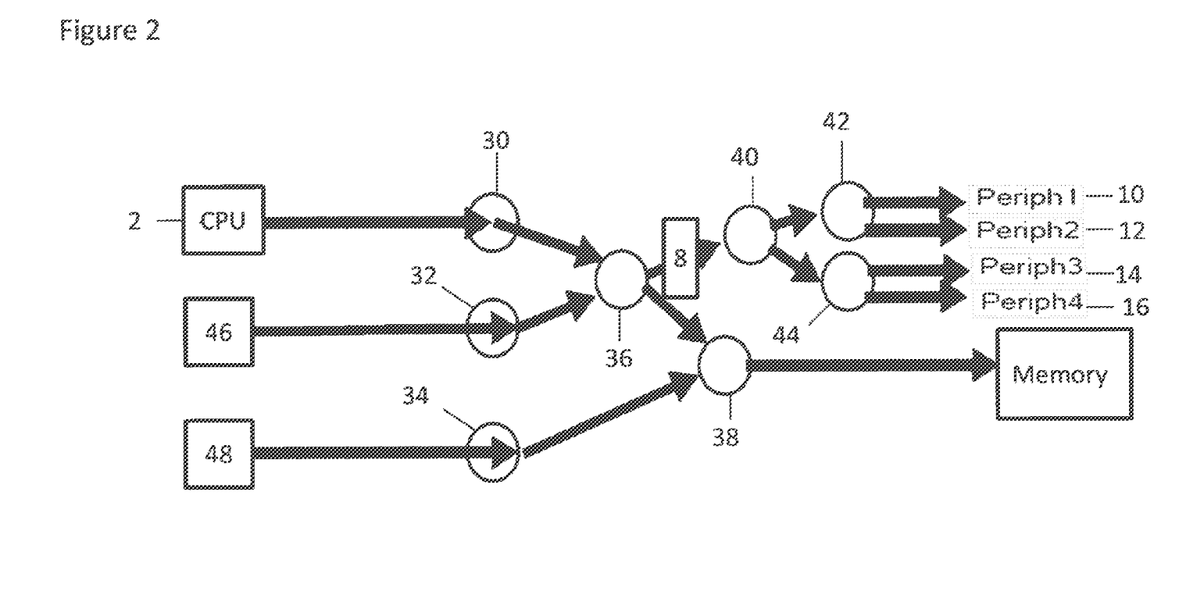
FIG. 2 shows a system in which embodiments may be provided, showing interconnect arbitration nodes.

Reference is made to FIG. 2 which shows schematically some of the interconnect arbitration components of the interconnect of the system on chip. This illustrates one way in which an interconnect can be implemented.

In this arrangement, a CPU 2 (a first data source) provides an output to a first interconnect arbitration component 30. A second data source 46 is provided which provides an output to a second interconnect arbitration component 32. Likewise, a third data source 48 is provided which itself provides an output to a third interconnect arbitration component 34. The first and second arbitration components 30 and 32 provide outputs to a fourth arbitration component 36. The third arbitration component 34 provides an output to a fifth arbitration component 38. The fourth arbitration component 36 also provides an output to the fifth arbitration component 38. The fifth arbitration component 38 provides an output to the memory 8. The fourth arbitration component also provides an output to a sixth arbitration component 40 which in turn provides an output to a sixth arbitration component 42 and the seventh arbitration component 44. The sixth arbitration component 42 provides an output to the first and second peripheral devices 10 and 12 whilst the seventh arbitration component 44 provides an output to the third peripheral device 14 and the fourth peripheral device 16

In the example shown, the configuration programming block 8 is provided between the fourth and sixth arbitration components 36 and 40. However, it should be appreciated that in different embodiments the configuration programming block 8 may be provided in any suitable location. In some embodiments, more than one configuration programming block 8 may be provided.

It should be appreciated that the interconnect arbitration components shown in FIG. 2 are by way of example only and other embodiments may have any suitable arrangement of interconnect arbitration components. In practice the number of arbitration component may be less or more than in the example shown. It should be appreciated, that in some embodiments, the interconnect can take a different form to that described and may not have interconnect arbitration components.

In some of the examples described, reference has been made to a bus system. It should be appreciated that in other embodiments, any other suitable interconnect system may be used. In some embodiments, a network on chip may be used.

In some embodiments, the configuration programming block is transparent to the system unless the configuration programming block 8 is performing peripheral configuration. In some embodiments, the configuration programming block may be directly addressed.

When the configuration programming block 8 is enabled, and for example is performing configuration of the peripheral devices, it may block other traffic. Once the configuration programming block 8 has been enabled, the configuration programming block 8 performs the configured peripheral programming sequence instead of the host CPU. This configuration may be an automated peripheral programming sequence. Once the configuration programming block 8 has completed the configuration of the peripheral devices or its involvement in the configuration process has been completed, the configuration programming block 8 will provide a notification to the CPU 2. This may be done for example via a status bit or interrupt.

The configuration programming block may be provided in any suitable location. Generally, a balance may be made between maximum benefit for the CPU (i.e. relatively low latency from the CPU to the configuration programming block) and minimal impact for other system functions passing through the configuration programming block 8. In some embodiments, the configuration programming block may be provided at the root of a peripheral configuration network or at the root of a branch containing a common group of peripheral devices. In some embodiments, one or more peripheral devices may be provided with its own configuration programming block 8. In some embodiments two or more configuration programming blocks 8 may be provided.

Figure 3:
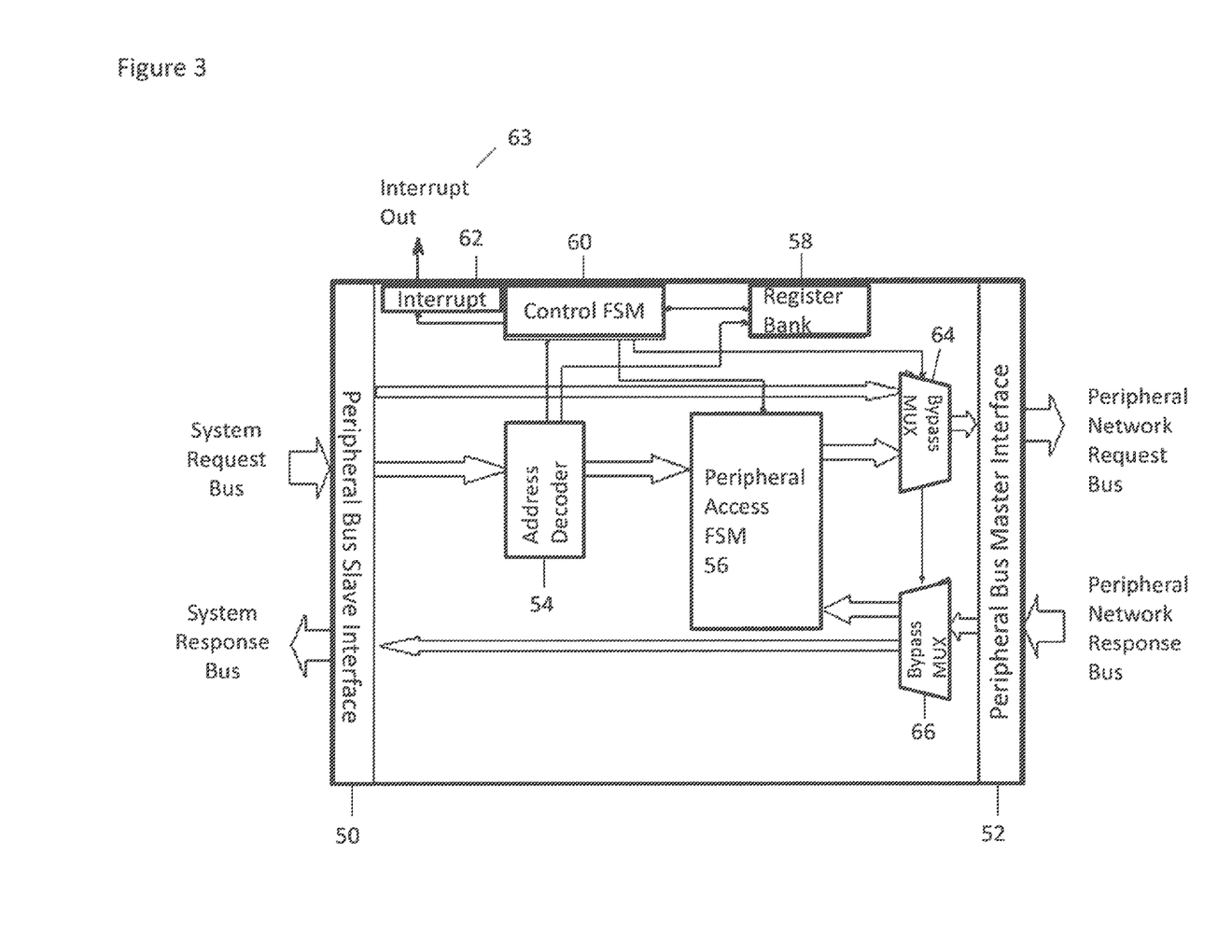
FIG. 3 shows a configuration programming block according to an embodiment.

Reference is made to FIG. 3 which schematically shows the configuration programming block 8 in more detail. The configuration programming block 8 has a first interface 50. The first interface 50 is configured to receive configuration control information from the CPU 2 and to output a response to the CPU. The response may be an acknowledgment, status information or any other suitable response data. The first interface 50 interfaces with the relatively low performance branch 24 of the bus system.

The configuration programming block 8 has a second interface 52. The second interface 52 is configured to output data to the peripheral programming bus system 28 and to receive data therefrom. The second interface therefore provides an interface with the relatively low performance branch 26 of the bus system to the peripherals.

The configuration programming block 8 has a register bank 58 which contains configuration information for controlling the configuration programming block 8. The configuration programming block 8 has interrupt generation circuitry 62 which is configured to generate, when necessary, an interrupt which is output via interrupt output 63.

The configuration programming block 8 has a control finite state machine FSM 60. The control FSM 60 is configured to receive instructions from the register bank 58. The control FSM 60 is configured to run those instructions. The control FSM 60 is configured to provide an output to the interrupt generation circuitry 62.

The configuration programming block 8 receives data from the CPU via the first interface 50. The data is provided to an address decoder 54. The address decoder 54 will provide an output to a second finite state machine 56. The address decoder 54 will provide an output to the register bank 58 and the control FSM 60. The second finite state machine 56 is configured to receive an output from the control FSM 60. The second FSM 56 provides an output to a first bypass multiplexer 64. The first bypass multiplexer 64 also receives the data from the CPU, not via the address decoder when the configuration programming block 8 is in the bypass mode. The first bypass multiplexer is controlled by the control FSM. The output of the first bypass multiplexer is provided to the second interface for output to the peripheral programming bus system 28.

The configuration programming block 8 also has a second bypass multiplexer 66 which is configured to receive data from the peripheral programming bus system 28 via the second interface. The second bypass multiplexer is controlled by the control FSM. The second bypass multiplexer 66 is configured to provide a first output to the second FSM when the configuration programming block 8 is enabled and to bypass the FSM when not enabled. The bypass output is provided to the first interface 50.

The control FSM 60 is responsible for responding to configuration programming register accesses as identified by the address decoder 54, and setting control registers accordingly. The control FSM is also responsible for initiating a series of transactions to perform the operation as configured by the control registers of the register bank 58.

The second FSM 56 may be responsible for creating the cycle correct and/or legal (in a bus standard/protocol sense) transactions that adhere to a specific bus protocol, as instructed by the control FSM 60.

An example of this is where the control FSM 60 has been configured to perform the same write to multiple peripheral address locations within a specified range. The range (start and end) are defined by two control registers, with the increment and data to be written defined by another two control registers. A final control register defines that this operation is the one required from a range of available ones. This final control register may also contain a bit that activates the configuration programming block and starts the control FSM operation, so this control register may be set last once other control registers have been set.

Once activated, the control FSM may block any accesses passing directly to the peripherals and may autonomously initiate a series of bus write requests to the second FSM for each address in sequence up to the end address defined. The second FSM will generate the necessary bus traffic and check responses to carry out the control FSM request. Upon completion of all bus writes, the control FSM will set a completion notification bit in the register bank and/or set an interrupt and un-block any direct accesses to the peripherals The address decoder allows the configuration programming block to identify transactions which are for the configuration programming block. If the configuration programming block is in a transparent mode, any transactions which are not for the configuration programming block are passed through. If the configuration block is configuring one or more peripherals, the configuration block will temporarily block or discard transactions which are not for the configuration programming block.

In some embodiments, the configuration programming block 8 is not provided with a dedicated programming interface. Accordingly, the configuration programming block 8 may be configured to intercept a transaction that is within its hard configured address range. The address decoder is used to intercept such transactions.

The register bank may allow the system to configure the configuration programming block to perform a number of different data manipulation functions to one or more peripheral devices.

As mentioned, the configuration programming block 8 has an idle mode. During the idle mode, the configuration programming block does not interfere with the data passing through. However, accesses to the registers of the register bank will be intercepted and processed. In the bypass mode, transactions or data will pass from the first interface to the bypass multiplexer 64, bypassing the address decoder 54 and the second FSM 56. Likewise for transactions in the other direction, data or transactions will be output by the second bypass multiplexer 66, bypassing the second FSM 56.

When the configuration programming block is enabled, the configuration programming block may not pass transactions or data from the system to the peripheral devices directly. The configuration programming block 8 may be controlled to enter the active or enabled mode once an appropriate bit or bits is/are set with in the register bank. When in the active or enabled mode, the configuration programming block 8 performs a sequence of read and/or write operations to the one or more peripheral devices. This will be as required for the configuration of the one or more peripheral devices.

When the configured setup has been completed, a status bit or bits is/are set. In some embodiments, an interrupt is set by the interrupt circuitry 62 and output. When the configuration setup has been completed, the configuration programming block 8 will return to the idle mode.

It should be appreciated that in the active mode, the configuration program block may not pass transactions directly from the system to the peripheral devices. Only the status register of the register bank 58 will be accessible and all other register transaction requests presented at the first interface will not be granted until the configuration programming block 8 returns to its idle mode. In some embodiments, if the configuration programming block receives a transaction request to a register other than the status register, the configuration programming block may issue a default error response back to the system.

Any suitable configuration may be performed by the configuration programming block 8 to configure one or more peripheral devices. By way of example only, some example operations will now be described.

Bit set/bit unset. This function and will set/unset the bits defined in a bit selection register of the register bank. The configuration programming block 8 will, for every nth address within the range, where n is an integer greater than or equal to one: read data from the address: change the selected bits to one or zero; and write the data back to that address.

Bit invert. This inverts the bits defined in the bit selection register. For each nth address within the range: read the data from the address; invert the selected bits; and write data back to the address.

Multiple data write. Common data is written to peripheral devices defined by the address range. The activity is repeated according to the setting of a counter register. This is repeated X times with the data written to every nth address in the range. X is an integer equal to 1 or more.

Data polling. Register contents are tested for match with a defined data word and required mask bits. This can be set continuously or repeated X times. This may be used where several peripheral devices need to be checked for a certain status, before the CPU can continue configuring peripherals. A time out limit may also be enabled. The transactions are continually repeated or limited to X times. Every nth address in the range is read.

The register bank 58 comprises a number of registers as mentioned previously. In some embodiments, a control status register is provided. That register may provide one or more of the following information:

One or more bits may indicate if the configuration programming block is active or inactive. One value of one bit may be used to indicate that the configuration programming block 8 is active whilst the other value will indicate the disabled mode.

When the block is put into the active mode, this will cause the command provided in the command bits to be executed. The command bits may indicate any of the previously mentioned configuration operations or any other suitable configuration operation.

In some embodiments, one or more status bits will indicate if a command has been completed or not.

The control status register may have one or more status bits which indicate the success or fail of a completed command.

The control status register may have address mode information, timeout information and the option of setting an interrupt on completion of a successful command.

In a system which does not have the configuration programming block, it could for example take many clock cycles to transfer data from the host CPU to the root of the peripheral configuration network and further cycles to reach the peripheral addressed. The same will be true of the associated response.

The interconnect between the CPU and the configuration programming block may often be a relatively high-performance bus protocol offering a request and response transactions so allowing writes to be pipelined. However, beyond the configuration programming block, the network may be a lower performance bus architecture in which a response must first be received before the next request is made. This may stall the relatively high performance bus.

Without the configuration programming block, with the CPU configuring a peripheral, the setting and un-setting of a single bit in several registers would require the CPU to take a relatively large number of cycles. However, in some embodiments, the configuration of the peripherals is effectively delegated by the CPU to the configuration programming block. Accordingly, once the CPU has provided the configuration programming block with the required information, the CPU is then free to perform other activities within a much shorter time frame, taking fewer clock cycles. Some implementations can reduce the number of clock cycles by around two thirds.

The configuration programming block may have a debug capability.

Some embodiments may have three registers to control the addressing—a start register, an end address register and an increment amount register. This may require three writes to set the registers in addition to the data and operation to be configured. In alternative embodiments, by reducing the range of the increment, this can be reduced to two writes without a significant reduction in function. In one example, a single register is used with 22 bits for the increment and 10 bits for the count in addition to the start register. This would mean that the number of registers is two instead of three. The count and increment together define the end address. The split of a 32 bit register between the increment and the count can be done in any suitable way other than the 22/10 example above.

Different sized registers may be used in different embodiments.

In some embodiments, one or more address modes are available:

Address increment—a start, end and increment value are selected for the address.

Address count—a start address, an increment and a count value are selected.

Address count fixed—a start address is selected, an increment and a count value are selected but the increment value and count value are in separate registers.

Address fixed—a single start address is set which is not incremented. This may be used for example for debug and polling commands.

Some embodiments may reduce the configuration time as compared to where the CPU alone is responsible for the configuration. This may improve the end user experience. In some embodiments, this can lead to a quicker boot time and/or configuration time and/or reconfiguration time.

Some embodiments have described the configuration programming block as being used to program one or more peripheral devices. Alternatively or additionally the configuration programming block may be used to configure one or more other devices. In some embodiments, the configuration programming device may be used to configure a device which typically requires a relatively low bandwidth of data, with a relatively high latency compared to another device requiring a relatively high bandwidth of data with a relatively low latency.

In the above embodiments, a CPU provides the overall control of configuration. In other words the CPU may be considered to provide a master configuration function. In other embodiments, any other suitable block or function may alternatively or additionally provide a master configuration function.

Some embodiments allow the configuration block to provide a local configuration function while being controlled by the master configuration function. This may reduce the load on the master configuration function. In some embodiments, the configuration block may be located on the side of the bus system close to the peripherals being configured. This may reduce the number of transactions being provided in the relatively slow and/or high latency path.

All of the various blocks shown in the figures may be implemented by circuitry, hardware, software or a combination thereof.

A device of some embodiments may be any suitable device as embodiments may have a wide range of applications. Some embodiments may be used where boot or configuration time should be as short as possible. Some device embodiments may be consumer electronics applications such as mobile phones, tablets, computers, smart phones, set top boxes, music players, DVD players, streaming devices or any other suitable device.

While this detailed description has set forth some embodiments of the present invention, the appending claims cover other embodiments of the present invention which differ from the described embodiments according to various modifications and improvements. Other applications and configurations may be apparent to the person skilled in the art.

What is claimed is:

1. A method, comprising:
   operating a processor of a system on a chip in a configuration mode until completion of a set of tasks; and
   operating the processor in a normal operation mode after completion of the set of tasks;
   wherein, during the configuration mode, performing steps of:
   sending configuration information from the processor to a configuration programming block,
   sending the configuration information from the configuration programming block to one or more electronic components to thereby complete a first subset of the set of tasks, while permitting the processor to complete a second subset of the set of tasks, and
   sending a notification from the configuration programming block to the processor after completing the first subset of the set of tasks.

2. The method of claim 1, further comprising completing the second subset of the set of tasks with the processor, the step of completing comprising retrieving data from a memory.

3. The method of claim 1, wherein operating the processor in the configuration mode occurs during boot-up of the system on a chip.

4. The method of claim 1, wherein the sending of the configuration information to the configuration programming block comprises transmitting over a low bandwidth bus; and further comprising completing the second subset of tasks, wherein completing comprises communicating with a memory over a high bandwidth bus.

5. The method of claim 1, wherein the step of sending the configuration information from the configuration programming block to one or more electronic components comprises writing at least one bit to at least one register of each of the one or more electronic components.

6. The method of claim 1, wherein the step of sending the configuration information from the configuration programming block to one or more electronic components comprises writing data multiple times to a given address of the one or more electronic components to flush an output buffer.

7. The method of claim 1, wherein the step of sending a notification from the configuration programming block to the processor comprises generating an interrupt or sending at least one status bit.

8. The method of claim 1, wherein the step of sending the configuration information from the configuration programming block to one or more electronic components comprises reading at least one bit from at least one electronic component, changing a value of the at least one bit, and writing the changed at least one bit back into the at least one electronic component.

9. The method of claim 1, wherein the step of sending the configuration information from the configuration programming block to one or more electronic components comprises writing common data to one or more of the electronic components.

10. The method of claim 9, wherein the configuration programming block writes the common data to a plurality of different addresses in an address range of at least one of the one or more electronic components.

11. The method of claim 1, further comprising blocking direct traffic to the one or more electronic components by the configuration programming block, during the configuration mode.

12. A method, comprising:
operating a processor in a configuration mode until completion of a set of tasks; and
wherein, during the configuration mode, performing steps of:
sending configuration information from the processor to a configuration programming block,
sending the configuration information from the configuration programming block to one or more electronic components to thereby complete the set of the tasks while blocking direct traffic to the one or more electronic components,
sending a notification from the configuration programming block to the processor after completing the set of the tasks.

13. The method of claim 12, wherein the step of sending the configuration information from the configuration programming block to one or more electronic components comprises writing at least one bit to at least one register of each of the one or more electronic components.

14. The method of claim 12, wherein the step of sending the configuration information from the configuration programming block to one or more electronic components comprises writing data multiple times to a given address of the one or more electronic components to flush an output buffer.

15. The method of claim 12, wherein the step of sending the notification from the configuration programming block to the processor comprises generating an interrupt or by sending at least one status bit.

16. The method of claim 12, wherein the step of sending the configuration information from the configuration programming block to one or more electronic components comprises reading at least one bit from at least one electronic component, changing a value of the at least one bit, and writing the changed at least one bit back into the at least one electronic component.

17. The method of claim 12, wherein the step of sending the configuration information from the configuration programming block to one or more electronic components comprises writing common data to one or more of the electronic components.

18. The method of claim 17, wherein the configuration programming block writes the common data to a plurality of different addresses in an address range of at least one of the electronic components.

* * * * *